(12) United States Patent
Henriksen

(10) Patent No.: US 6,446,171 B1
(45) Date of Patent: Sep. 3, 2002

(54) METHOD AND APPARATUS FOR TRACKING AND UPDATE OF LRU ALGORITHM USING VECTORS

(75) Inventor: Anders Rosholm Henriksen, Valby (DK)

(73) Assignee: MIPS Technologies, Inc., Mountain View, CA (US)

(*) Notice: Subject to any disclaimer, the term of this patent is extended or adjusted under 35 U.S.C. 154(b) by 0 days.

(21) Appl. No.: 09/517,272

(22) Filed: Mar. 2, 2000

(51) Int. Cl.[7] .............................................. G06F 12/00
(52) U.S. Cl. ...................... 711/136; 711/128; 711/160
(58) Field of Search .................................. 711/128, 136, 711/160

(56) References Cited

U.S. PATENT DOCUMENTS

| | | | |
|---|---|---|---|
| 5,325,511 A | 6/1994 | Collins et al. ............... | 395/425 |
| 5,481,691 A | 1/1996 | Day, III et al. .............. | 395/425 |
| 5,530,833 A | * 6/1996 | Iyengar et al. ............... | 711/128 |
| 5,611,072 A | 3/1997 | Tran ............................ | 395/463 |
| 5,615,353 A | * 3/1997 | Lautzenheiser ............. | 711/139 |
| 5,724,547 A | 3/1998 | Iyengar et al. ............... | 395/455 |
| 5,765,191 A | 6/1998 | Loper et al. ................. | 711/136 |

* cited by examiner

Primary Examiner—Do Hyun Yoo
Assistant Examiner—Mehdi Namazi
(74) Attorney, Agent, or Firm—James W. Huffman

(57) ABSTRACT

An apparatus and method for tracking the LRU state of memory locations in data ways or nodes is provided. Vectors are utilized between each entry in each node with the direction of the vectors corresponding to the LRU state of an entry. The vectors are stored within a vector table. Vector r/w control is provided to update only those vectors corresponding to entries that are being accessed, with the update occurring without regard to the LRU state of entries that are not being accessed. A vector mask is coupled between the vector r/w control and the vector table to prevent update of vectors corresponding to entries that are not being accessed. When an entry (such as a cache line in a set associative cache) within the node is accessed, the vectors associated with the node are updated to reflect the access, with no need to determine the LRU state of other nodes.

33 Claims, 8 Drawing Sheets

600

| | AB | AC | AD | BC | BD | CD | | A | B | C | D |
|---|---|---|---|---|---|---|---|---|---|---|---|
| cycle 1 | 0 | 0 | 0 | 1 | 1 | 0 | | mru | lru | mru-1 | lru+1 |
| read A | 0 | 0 | 0 | 1 | 1 | 0 | ⇒ | mru | lru | mru-1 | lru+1 |
| read B | 1 | 0 | 0 | 0 | 0 | 0 | | mru-1 | mru | lru+1 | lru |
| read C | 1 | 1 | 0 | 1 | 0 | 0 | | lru+1 | mru-1 | mru | lru |
| read D | 1 | 1 | 1 | 1 | 1 | 1 | | lru | lru+1 | mru-1 | mru |
| read B | 1 | 1 | 1 | 0 | 0 | 1 | | lru | mru | lru+1 | mru-1 |

660 cycle 1 read A read B read C read D read B (2nd)

METHOD AND APPARATUS FOR TRACKING AND UPDATE OF LRU ALGORITHM USING VECTORS

BACKGROUND

1. Field of the Invention

This invention relates in general to the field of data storage tracking in computer systems, and more particularly to an improved method and apparatus for using vectors to track and update which alternative way within an aliased storage is the least recently used (LRU).

2. Description of the Related Art

Modern computer systems employ a number of different memory devices and memory architectures to store instructions that will be executed, or data that will be processed. Memory systems typically include a combination of different types of memory devices, each provided for a particular purpose. For example, a hard disk drive is a memory device that provides a large area for permanent storage of instructions and data at a relatively nominal cost. A second type of memory device is a dynamic random-access-memory, or DRAM. DRAM provides temporary storage for instructions and data, and is several orders of magnitude faster than a hard disk drive. However, DRAM is also much more expensive than hard disk memory. A third type of memory device is a static random-access-memory, or SRAM. SRAM provides temporary storage for instructions and data, and is significantly faster than DRAM. However, it is even more expensive than DRAM. Thus, a system designer typically uses a mixture of memory types of varying sizes to obtain differing cost/performance specifications.

A typical memory configuration utilizes a hard disk drive as the primary storage location for instructions and data, and places DRAM between the hard disk drive and the processing system for temporary storage of data. A small portion of SRAM is then usually placed between the processor and the DRAM to store a subset of the data in DRAM.

An exemplary operation of these memory systems is as follows. A processing system requests an instruction/data from the memory system. If the instruction/data is present in SRAM, the instruction/data is provided to the processing system with zero wait states, i.e., the SRAM does not cause the processing system to wait for the instruction/data. If the SRAM does not contain a copy of the requested instruction/data, the processing system must go to the DRAM. If the instruction/data is available in DRAM, the data is provided to the SRAM, along with other instructions/data that will likely be needed in subsequent operations. The SRAM then provides the requested instruction/data to the processing system. In some instances, the requested data is provided directly to the processing system in parallel with providing it to the SRAM. However, if the instructions/data has to be provided to the SRAM from the DRAM, the processing system is often required to wait, or halt processing, until the transfer has been made. Of course, if the requested instructions/data is not in the DRAM, a transfer of the data must first be made from the hard disk drive to the DRAM, and then subsequently to the SRAM. This situation requires the processing system to halt processing for a significant amount of time.

Once the data is in the SRAM, it must be referenced or "tagged" so that it can later be identified as associated with the data in DRAM. The purpose of a tag is to store the address in DRAM of the data that is stored in the associated SRAM location. Then, when a processing system requests data from DRAM, the address of the requested data is compared to the contents of the tags in SRAM, and if a match is found, data in the associated SRAM location is provided to the processing system, without the delay usually associated with data retrieval from DRAM.

In early small cache systems (fully associative), tags often contained enough bits to store the full physical address of the DRAM location that was copied to the associated SRAM location. However, this arrangement required that each tag be compared to a generated address to determine whether a "hit" in the SRAM occurred. This was too time consuming, and was impractical for larger caches.

Caches of lesser associativity than fully associative caches, termed "set-associative caches", were introduced to correct this problem and to allow larger caches to be used. Set-associative caches view cache memory the same way the processing system views pages in main memory. Addressable memory is divided into a number of pages, where each page has a number of sets of data contained therein. To address a particular memory location, the page (the physical page number) is determined from the upper bits of the address, and the set (the offset or index) is determined from the lower bits of the address.

By organizing the cache memory to contain the same amount of data as a page in DRAM, each set in the cache had a one to one correspondence with a set on a page in DRAM. The lower address bits of an address could then be used to select a particular set, or tag. The tag could contain the upper address bits that corresponded to the page in DRAM of the data copied into the associated SRAM location. Thus, when an address was generated by a processing system, the lower address bits referenced a particular tag (or set), and the upper address bits were compared to the contents of the referenced tag. Thus, in a set associative cache, determining whether a cache memory contained the desired data only required comparison of the upper bits of the address to a single tag within each set. A four-way set-associative cache, for example, would only require four comparisons, often performed in parallel.

Since cache memory can only store a subset of information/data required by a processor, it is desired to replace the data that will most likely not be used anymore (or in near future) when placing new data into one of the sets. A method that is often used to select which data/set to replace picks the data/set that was least recently accessed/used (LRU).

One method commonly used to track which "set" within a cache contains the least recently used data assigns two bits (in a 4 way set associative cache) to each line in each of the cache ways to track the states of the cache lines. That is, in a 4-way cache, there are 4 distinct possibilities, or states, that each cache line can be in. These are typically identified as least recently used (LRU), LRU+1, most recently used (MRU), and MRU−1. So, for a 4-way cache, 8-bits are used for each cache line, that identify the states of the cache lines in each way. If there are 64 cache lines in each way, the LRU information is typically stored in an LRU table that is 8 bits by 64 lines, for example. This is particularly described in U.S. Pat. No. 5,765,191 entitled "METHOD FOR IMPLEMENTING A FOUR-WAY LEAST RECENTLY USED (LRU) MECHANISM IN HIGH PERFORMANCE", which is hereby incorporated by reference.

A number of LRU algorithms have been developed to try to reduce the number of bits required to track the states of the cache lines within a multiple way cache. One method, discussed in the above referenced patent, eliminates two bits associated with each line in one of the cache ways, and deduces the state of the cache lines in that cache way from the remaining three cache ways. That is, if the states of corresponding cache lines in the other three ways are known, then the state of the corresponding cache line in the remaining way may be determined. The above referenced patent takes this one step further, and reduces the number of bits per cache line to 5 to properly determine the state of the cache lines in each of the cache ways (in a 4-way set associative cache).

Regardless of the number of bits used to determine the tate of cache lines in a multiple way cache, what has not et been discussed is the need to update each of the "LRU state" bits any time a read or a write occurs to a cache line. That is, when a processing system reads data from a cache line in one of the cache ways, the LRU state of that cache line must be marked as MRU. When a corresponding cache line in another way is read from or written to, its state must be changed to MRU, and the state of the previously accessed cache line must be changed to MRU−1. Going further, when a corresponding cache line in a third way is accessed, its state must be changed to MRU, and the other two lines must have their states changed to MRU−1, and LRU+1, respectively. Finally, when a corresponding cache line in a fourth way is accessed, its state is changed to MRU, and the other three lines have their states changed to MRU−1, LRU+1 and LRU, respectively. So, for each read or write to a cache line, the state bits associated with each way must be read, modified, and rewritten to reflect the current LRU state of each of the cache lines.

Requiring the processing system to perform a read-modify-write (r-m-w) procedure to update the LRU table to reflect the current state of cache lines in each way every time a cache is accessed, is both time consuming, and hardware intensive. In some instances, updates of the LRU table may not occur within the same clock cycle as the access to the cache. In other instances, subsequent cache accesses may be delayed until the state of the LRU table is either updated, or at least determined.

What is needed is an apparatus and method that eliminates the need to determine the state of all of the LRU bits associated with a cache line when a line is accessed.

Furthermore, what is needed is a method and apparatus that allows the state of an LRU table to be updated when a cache line is accessed, without requiring a read-modify-write sequence.

What is also needed is a method of updating the state of a cache line when it is accessed, without consideration or regard for the pre-existing states of the corresponding cache lines in the other ways.

SUMMARY

For the foregoing reasons, there is a need for an apparatus and method that allows an LRU table to be updated when an entry in a cache way is accessed, without regard to the LRU states of entries in the alternate cache ways.

To address the above-detailed deficiencies, it is an object of the present invention to provide a method for tracking an LRU state for each of a plurality of memory locations (ways or nodes). The method includes: associating vectors between aliased memory locations, each of the vectors having a direction; and when one of the nodes is accessed, updating the direction of its associated vectors to reflect the access. The LRU state for the nodes is determined by the direction of its associated vectors.

Another object of the present invention is to provide an LRU tracking mechanism for aliased entries in alternate cache ways. The mechanism includes a vector table, and vector r/w control. The vector table has a number of vector entries, each entry having a number of vector fields, each vector field associated with one of the aliased entries in the cache ways. The vector r/w control is coupled to the vector table, to update the vector fields associated with an entry in a particular one of the cache ways when the entry is accessed.

Yet another object of the present invention is to provide a method for tracking the LRU state of entries in aliased nodes. The method establishes vectors between each of the entries in each of the aliased nodes, each of the vectors having a direction towards or away from an entry. The method includes determining whether an access is being made to a particular entry in a particular one of the aliased nodes; and if an access is being made, updating the direction of each of the vectors associated with the particular entry to reflect an LRU state after the access.

A further object of the present invention is to provide a computer program product for use with a computing device, the computer program product having a computer usable medium of computer readable program code embodied in the medium for causing an LRU vector tracking apparatus to be described. The computer readable program code includes first program code for providing a vector table, the vector table having vector fields associated with LRU states for corresponding data storage entries; and second program code for providing vector r/w control to update the vector fields when said corresponding data storage entries are accessed.

Additional objects, features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

The present invention will become better understood with regard to the following description, and accompanying drawings where.

DETAILED DESCRIPTION

Figure 1:
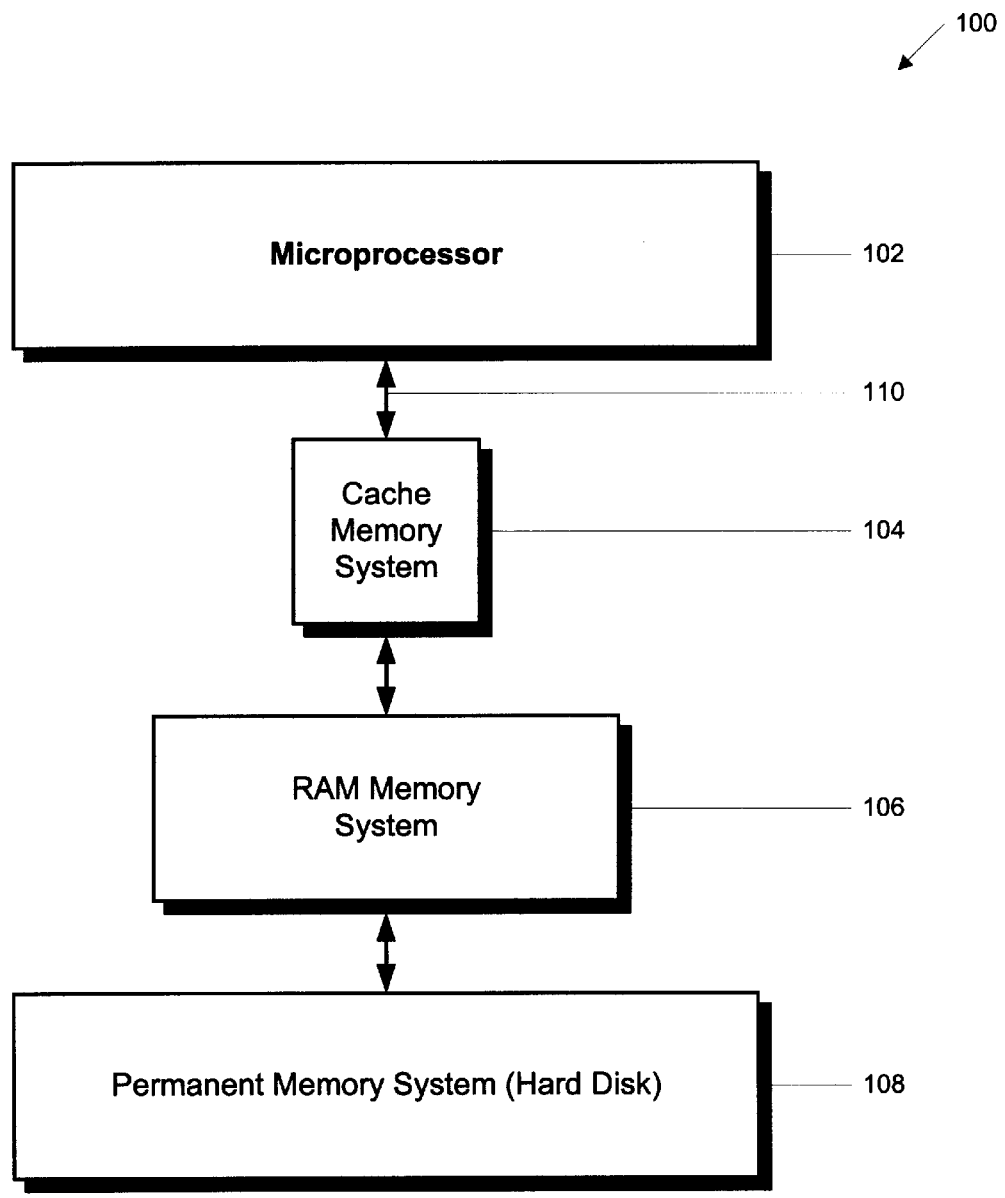
FIG. 1 is a block diagram of a prior art computer system having a cache memory system.

Referring to FIG. 1, a block diagram of a prior art computer system 100 is shown. The computer system 100 includes a microprocessor 102 connected to a cache memory system 104, and then to a RAM memory system 106, and finally to a permanent memory system 108.

In operation, the processing system 102 reads instructions and/or data from the cache memory 104, executes the instructions, or operates on the data, and stores results back into the cache memory 104. More specifically, the processing system 102 provides an address for each desired instruction/data on an address bus 110. The cache memory system 104 looks at its tag array (not shown) to determine whether the desired instruction/data is present within the cache memory. If so, then the instruction/data is provided immediately to the microprocessor 102. However, if the desired instruction/data is not stored within the cache memory, the instruction/data is retrieved from the RAM 106, placed into the cache memory system 104, and then provided to the microprocessor 102. In the event that the desired instruction/data is not within the RAM memory 106, a transfer is made from the permanent memory system 108 to the RAM 106, and either concurrently, or subsequently, to the cache memory system 104.

Figure 2:
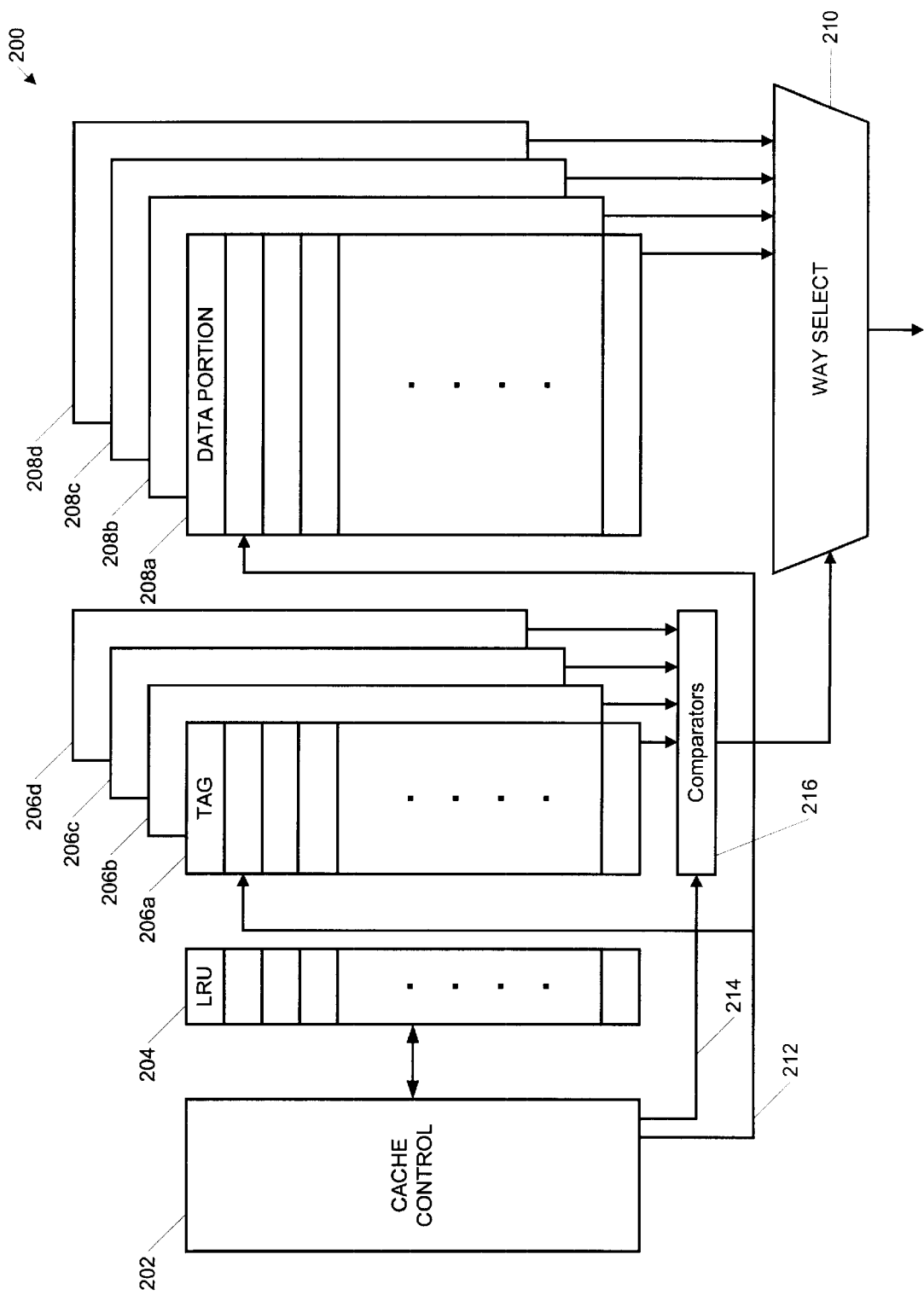
FIG. 2 is a block diagram of the cache memory system of FIG. 1.

Now referring to FIG. 2, a detailed block diagram 200 is provided particularly illustrating the prior art cache memory system 104 of FIG. 1. One skilled in the art will appreciate that cache systems may vary from the below description. However, it should be appreciated that the below description is designed to aid the reader in an understanding of how an LRU table is updated in the prior art, within the context of a particular cache system, but that the prior art method described for updating an LRU table is ubiquitous across different cache architectures. The cache memory system 104 is configured as a four way cache (a, b, c, d) with each way having 64 cache lines. In other words, each of the 64 cache lines can be looked upon as having four congruence ways. The cache memory system 200 contains a cache control 202 coupled to a tag directory 206. The tag directory 206 also contains four ways (a, b, c, d) corresponding to the four data ways 208 (a, b, c, d), respectively.

When an address is presented by a microprocessor (not shown) to the cache control 202, the low order portion of the address indexes into each of the cache ways 208 (a–d), and into each of the TAG tables 206 (a–d), via bus 212. The high order portion of the address is presented, via bus 214 to a set of comparators 216 at the output of the TAG array 206. The high order portion of the address is compared to the contents of four tag lines within the tag arrays 206 (a–d), corresponding to the tag lines indexed into by the low order portion of the address, to determine whether the desired instruction/data is present in one of the cache ways 208 (a–d). If there is an address match within one of the four tag arrays 206 (a–d), then a cache selection signal is provided by the tag array 206 to way select logic 210. The way select logic 210 outputs data from the cache way 208 (a–d) corresponding to the indexed cache line, and the tag array 206 containing the matched high order address.

The cache control 202 is also coupled to an LRU table 204. The LRU table 204 contains an entry for each cache line within the cache array 208 to indicate which way, associated with a particular cache line, was accessed last, and which cache way, associated with a particular cache line, is the least recently used. More specifically, the LRU table 204 contains LRU fields corresponding to each way within the four cache arrays 208 (a–d). In one embodiment, a four way cache implies that each way can be in one of four states: least recently used (LRU), LRU+1, most recently used (MRU), and MRU-1. So, each entry in the LRU table 204 contains four fields, one for each cache way 208, and each field can have one of four distinct values: LRU, LRU+1, MRU-1, and MRU. A detailed description of the prior art LRU table 204 will now be provided with respect to FIG. 3, followed by a detailed description of how the cache control 202 updates the LRU table 204, with respect to FIG. 4.

Figure 3A:
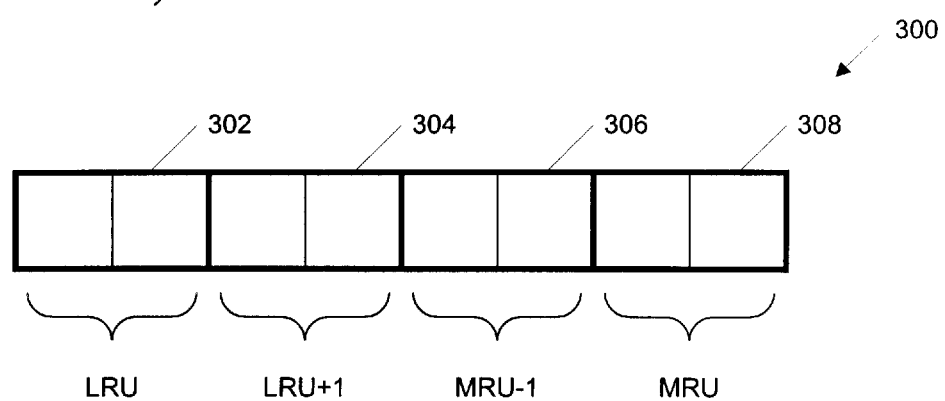
FIGS. 3a and 3b illustrate prior art methods for tracking LRU information for cache lines.

Referring now to FIG. 3a, a block diagram 300 is provided particularly illustrating four fields 302, 304, 306, and 308 within an entry of the LRU table 204. Each field 302–308 contains two bits to indicate one of four possible LRU states for a corresponding way a–d within the cache memory 208. That is, field 302 indicates that way (a) is the least recently used (LRU). Field 304 indicates that way (b) has the state of LRU+1. Field 306 indicates that way (c) has the state of MRU-1. Field 308 indicates that way (d) has the state of MRU. Thus, 8-bits are required for each entry 300 within the LRU table 204 to completely describe the LRU states of each cache line within the four way cache 208.

Figure 3B:
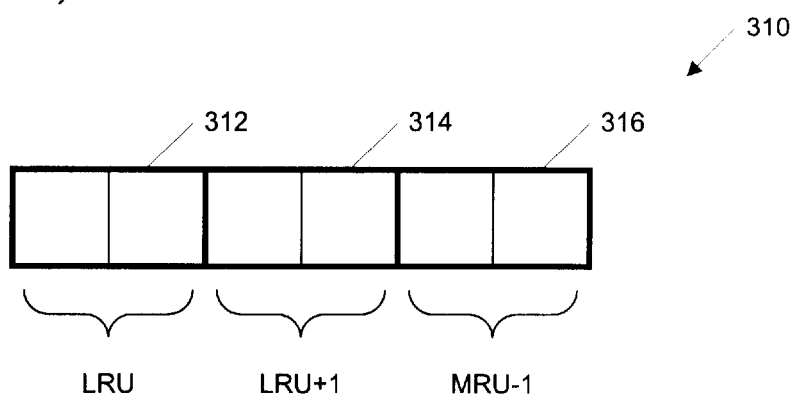

Referring now to FIG. 3b, an alternative prior art LRU entry 310 is shown. In the entry 310, the number of bits required to track the LRU states of the four-way cache 208 is reduced to 6-bits. In this embodiment, three fields 312, 314, and 316 are used to track the LRU states of three of the cache ways 208 (a–c). The LRU state of the fourth cache way 208d is then deduced from the other three states. The advantage of the LRU entry 310 is that 2-bits have been eliminated from every entry in the LRU table 204, thus conserving space and power within the cache memory system 200.

Figure 4:
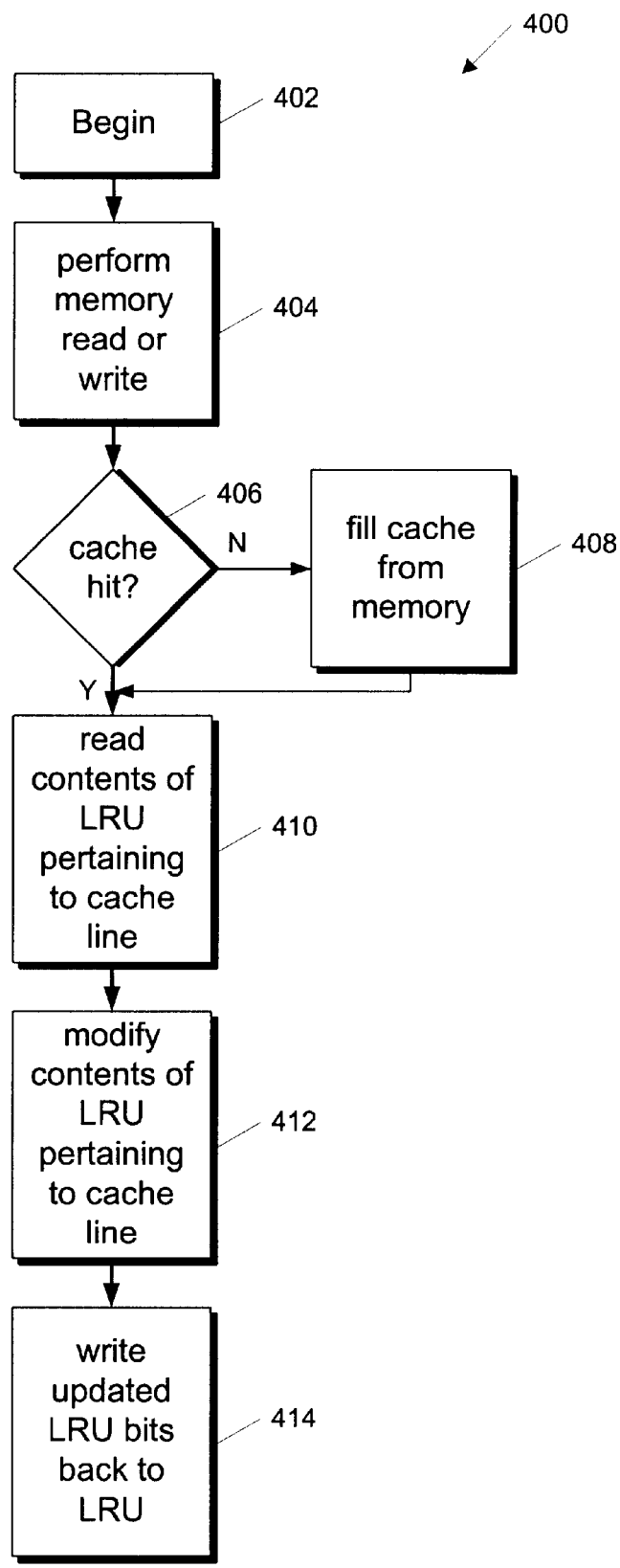
FIG. 4 is a flow chart illustrating the read-modify-write sequence typically required for updating an LRU table during a cache access.

Referring now to FIG. 4, a flow chart 400 is provided that particularly illustrates how the LRU table 204 (using either of the entries 300, 310) is updated each time the cache system 200 is accessed. Flow begins at block 402 and proceeds to block 404.

At block 404, a memory read or a memory write is presented by a microprocessor. Flow then proceeds to decision block 406.

At decision block 406, a determination is made as to whether there is a cache hit. That is, the cache control presents the address associated with the read/write to the tag arrays 206. If the address is found within the tag arrays 206, then there is a cache hit, indicating that the desired data associated with the read/write is contained within the cache memory 208. If the address is not found within the tag arrays 206, this indicates that the desired data is not contained within the cache memory 208, and thus must be retrieved from RAM. If there is a cache hit, flow proceeds to block 410. If there is not a cache hit, flow proceeds to block 408.

At block 408, a burst read from memory is typically performed to fill a line within one of the cache ways 208. If a cache line is 32 bytes wide, and the data bus is 64 bits wide, a burst read typically requires four back-to-back transfers to fill a cache line. Of course, one skilled in the art will appreciate that other cache line fill scenarios exist. In most cache systems, the data from a cache fill is not placed immediately into a cache line within one of the cache ways 208 (a–d). Rather, the data is temporarily placed into a cache line buffer, or a response buffer, until the entire cache line has completed transfer from memory. The cache line will then be written into the LRU way, as determined below. Flow then proceeds to block 410.

At block 410, the contents of the LRU table 204, associated with the desired cache line are read. That is, if there was a cache hit, the entry in the LRU table associated with the cache hit is read. If there was a cache miss, then the entry in the LRU table associated with the cache line into which the burst read will be placed is read. In either case, the LRU entry provides the cache control 202 with an understanding of the LRU states of each of the cache ways a–d. Flow then proceeds to block 412.

At block 412, the LRU entry that was read in block 410 is modified according to the action performed. For example, presume that the LRU states of the cache ways 208 (a–d) are as shown in FIG. 3A. Now presume that a cache hit has been determined for a read, and that the hit is to a line in cache way (c), corresponding to field 306. If this is the case, then way (c) becomes the MRU. Correspondingly, field 308 becomes MRU−1. Fields 302 and 304 remain the same. Thus, the LRU entry is modified as above. Flow then proceeds to block 414.

At block 414, the modified fields of the LRU entry are written into the LRU table. At this point, one skilled in the art will appreciate that whether the LRU entries are 8-bits wide, 6-bits wide, or in some other arrangement, each time an access is made to a cache line in one of the cache ways, the entire entry of the LRU table associated with the cache line must be read, modified, and rewritten. This read-modify-write (RMW) sequence is time consuming, and hardware intensive. And, as the number of ways within the cache grows, say to 8 or 16, the need to read the values of all of the fields in an LRU entry become even more problematic. It is this read-modify-write scenario, coupled with the need in the prior art to determine the LRU states of each field in an LRU table that the present invention overcomes.

Figure 5:
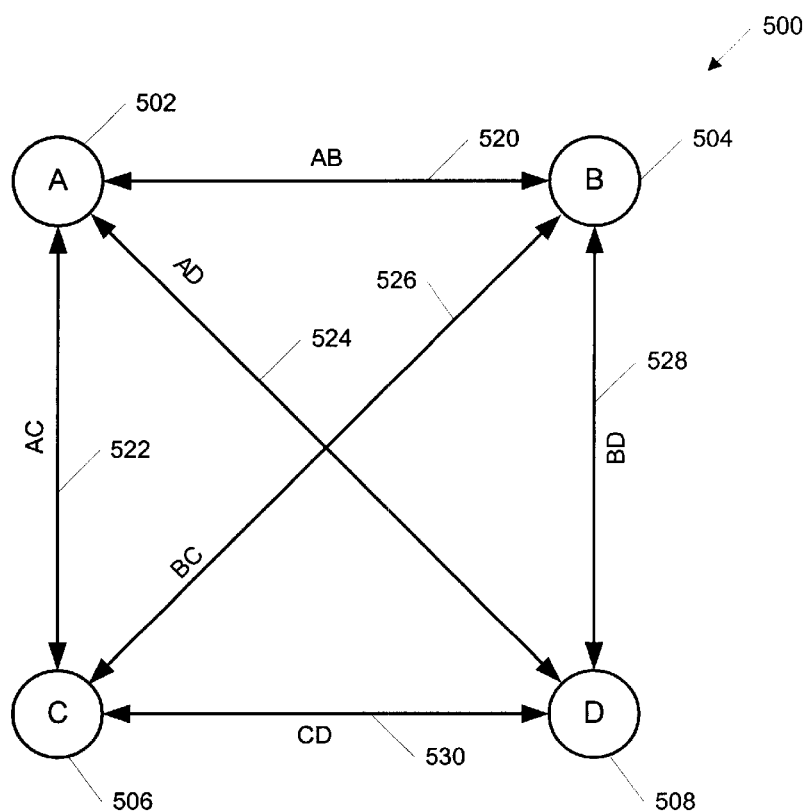
FIG. 5 is a diagram and table illustrating tracking of LRU information utilizing vectors, according to the present invention.

Referring now to FIG. 5, a vector diagram 500 is provided, along with a vector table 540, which illustrates the unique methodology of the present invention in tracking the LRU states of an aliased memory/register system, such as a four-way cache. The vector diagram 500 shows four ways that are treated as nodes: A 502, B 504, C 506, and D 508. Each way or node 502–508 is shown connected to each other via vectors 520–530.

More specifically, the four ways 502–508 require six vectors 520–530 to completely define the LRU states using the vector methodology of the present invention. Each of the vectors 520–530 has a direction associated with it that can be defined by a single bit. So, for an n-way memory system, the state of the vectors can by described using (n−1)+(n−2)+ . . . +2+1=0.5*n*(n−1) bits. For example, the LRU states of a four-way cache can be completely defined using 0.5*4*(4−1)=6 1-bit vectors. An eight way cache can be completely defined using 0.5*8*(8−1)=28 1-bit vectors.

Using the present invention, each way or node is completely described by its vectors, either pointing towards it, or pointing away from it. Node A 502, for example, is defined by vectors AB 520, AC 522, and AD 524. Node B 504 is defined by vectors AB 520, BC 526, and BD 528. Node C 506 is defined by vectors AC 522, BC 526, and CD 530. Node D 508 is defined by vectors AD 524, BD 528, and CD 530.

Figure 6:
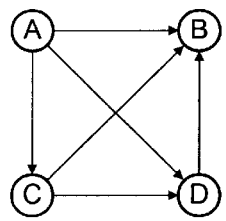
FIG. 6 provides a table, and vector diagrams, illustrating LRU tracking using vectors according to the present invention.
Figure 6:
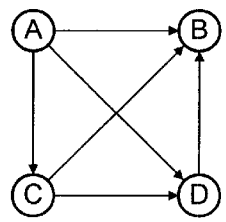
Figure 6:
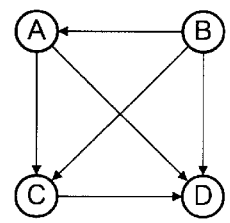
Figure 6:
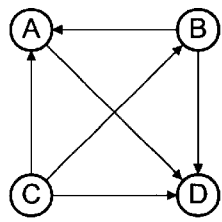
Figure 6:
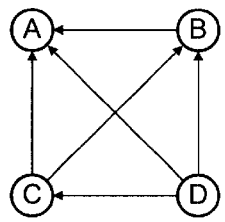
Figure 6:
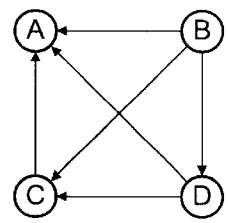

Referring now to FIG. 6, a vector table 600 is shown illustrating how the vector methodology of the present invention utilizes 1-bit for each vector to define the LRU states for the four nodes shown in FIG. 5. Each vector is defined in terms of a principle node, and a secondary node. Thus, vector AB defines a direction from a principle node A, to a secondary node B. Presuming that a 1-bit value of "0" indicates a vector direction away from the principle node, if vector AB has a value of "0", this indicates that vector AB is pointing away from principle node A, and towards secondary node B.

Since the direction of each of the six vectors are binary (that is, they can only point in one of two directions), at any time, a node will be in one of four states. A node will either have 3 vectors pointing towards it, 2 vectors pointing towards it, 1 vector pointing towards it, or 0 vectors pointing towards it. Mapping the vector combinations to LRU states results in the following. If a node has 3 vectors pointing towards it, then it is considered to be the least recently used (LRU) node. If it has 2 vectors pointing towards it, then it is considered to be the LRU+1 node. If it has 1 vector pointing towards it, then it is considered to be the MRU−1 node. If it has 0 vectors pointing towards it, then it is considered to be the MRU node.

In addition, since each node is defined by its vectors, when a node is accessed, the LRU table can be updated without regard to vectors that are not associated with the accessed node. That is, the state of vectors that are not part of the access are irrelevant, and do not need to be determined or updated prior to updating the vectors associated with the accessed node. This eliminates the time consuming read-modify-write process described above with reference to FIG. 4.

This is particularly illustrated in the vector diagrams 660, each corresponding to a different cycle in the table 600. Beginning in cycle 1, the entry in the LRU table is "000110" with each bit pertaining to one of the six vectors AB, AC, AD, BC, BD, or CD. All vectors corresponding to node A have a value of "0". This means that all vectors point away from the principle node A, and therefore node A has an LRU state of MRU. The three vectors associated with node B (AB, BC, and BD) all point towards node B indicating that node B has a state of LRU. The three vectors associated with node C (AC, BC, CD) indicate that 1 vector is pointing towards it. Thus, node C has a state of MRU−1. The three vectors associated with node D (AD, BD, and CD) indicate that 2 vectors are pointing towards it. Thus, node D has a state of LRU+1.

Now, presuming that a read "hit" occurs in node A, according to the present invention, the only change that is required to be made in the LRU table is to the vectors associated with node A (AB, AC, and AD). To indicate that node A is the MRU, each of the vectors must point away from node A. Thus, by writing a value of "0" into the 3 bits associated with node A, node A is made the MRU. This writing of "0" into the 3 bits associated with node A is performed without regard to vectors BC, BD and CD. In read cycle A, no change is made to the LRU states of nodes A–D.

In read cycle B, a cache access is made to the same line as in read cycle A, but this time, to node or way B. Thus, the vectors associated with node B must be updated to point away from node B. These vectors AB, BC and BD are therefore updated with values "1,0,0" respectively. By changing the direction of each of these vectors, the LRU state of node B is changed to MRU. In addition, node A now has one vector pointing towards it indicating that it has a state of MRU−1. Node C now has two vectors pointing towards it indicating that it has a state of LRU+1, and node D has three vectors pointing towards it indicating that it has a state of LRU.

In read cycle C, a cache access is made to the same line as in read cycles A and B, but this time, to node or way C. Thus, the vectors associated with node C must be updated to point away from node C. These vectors AC, BC, and CD are updated with values "1,1,0", respectively. By changing the direction of each of these vectors, the LRU+1 state of node C is changed to MRU. In addition, node A now has two vectors pointing towards it indicating that it has a state of LRU+1. Node B now has one vector pointing towards it indicating that it has a state of MRU−1. And node D has three vectors pointing towards it indicating that it has a state of LRU.

In read cycle D, a cache access is made to the same line as in read cycles A, B and C, but this time, to node or way D. Thus, the vectors associated with node D must be updated to point away from node D. These vectors AD, BD, and CD are updated with values "1,1,1", respectively. By changing the direction of each of these vectors, the LRU state of node D is changed to MRU. In addition, node A now has three vectors pointing towards it indicating that it has a state of LRU. Node B now has two vectors pointing towards it indicating that it has a state of LRU+1. And node C has one vector pointing towards it indicating that it has a state of MRU−1.

In the second read cycle B, a cache access is made to the same line as in the other read cycles, but this time, to node or way B. Thus, the vectors associated with node B must be updated to point away from node B. These vectors AB, BC, and BD are updated with values "1,0,0", respectively. By changing the direction of each of these vectors, the LRU+1 state of node B is changed to MRU. In addition, node A now has three vectors pointing towards it indicating that it has a state of LRU. Node C now has two vectors pointing towards it indicating that it has a state of LRU+1. And node D has one vector pointing towards it indicating that it has a state of MRU−1.

One skilled in the art should appreciate that to update the LRU states of an entry in the LRU table, only those vectors associated with a cache access were required to be updated, without regard to the states of the other vectors. Thus, since the states of vectors disassociated with a cache access are irrelevant, there was no need to perform a read, or modify, of the LRU entry prior to updating the vectors. While particularly illustrating the LRU update methodology of the present invention with read cycles, it should be appreciated that the LRU states of alternative ways or nodes are updated in the same manner for write cycles.

Furthermore, when replacing a cache line, the determination of which way or node should be replaced (i.e., the way or node that is the LRU) is accomplished by simply examining an entry, and determining which node has all of the vectors pointing towards it.

The above discussion with reference to FIG. 6 is provided to illustrate how vectors are used to determine the LRU states of a four-way cache. However, one skilled in the art should appreciate that the vector tracking methodology described is relevant to any number of cache ways, as well as to other register/memory storage technologies. In addition, the direction of the vectors has been defined in binary form "0/1" to indicate direction towards or away from a principle node, respectively. The definition of the direction of a vector, or the bits used to track the vector direction, are not important. Rather, it is the use of vectors to establish LRU states, and the updating of only those vectors associated with an entry corresponding to an accessed node or way, that allows the present invention to eliminate the RMW sequence of the prior art.

Figure 7:
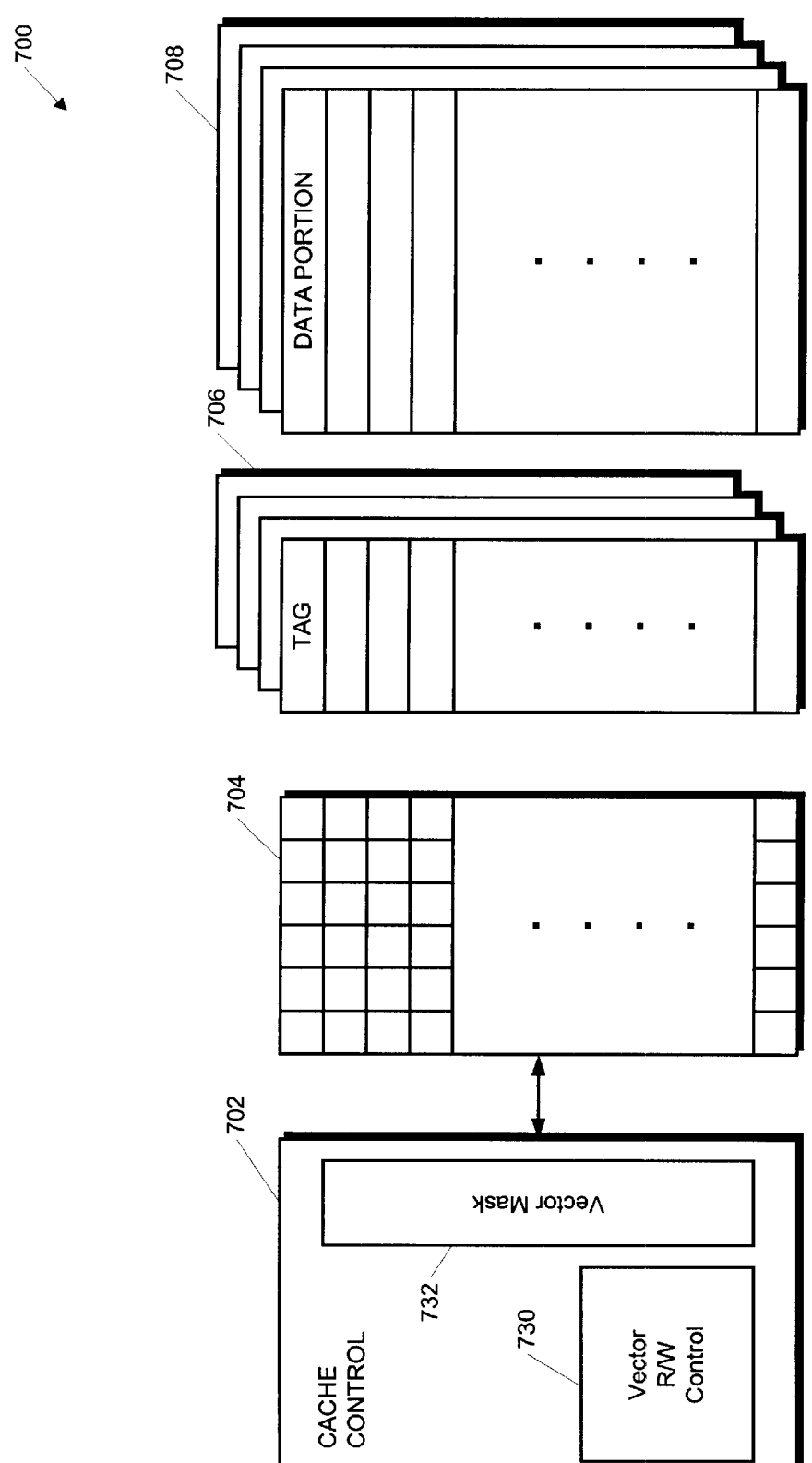
FIG. 7 is a block diagram of the vectorized LRU table, and cache control according to the present invention.

Referring now to FIG. 7, a block diagram is shown of a cache system 700 that incorporates the vector tracking methodology of the present invention. The cache system 700 includes a four-way cache 708, having tag arrays 706, and cache control 702. However, rather than having an LRU table (as described above with reference to FIG. 2), the present invention incorporates a vector table 704. For a four-way cache, the vector table 704 includes n-entries of 6-bits each. The vector table 704 is coupled to the cache control 702 via a vector mask 732, and vector R/W control 730. The purpose of the vector mask 732 is to allow a write to be performed to selected bits within an entry in the vector table 704. That is, if access is made to way A within the cache 708, a write must be performed to update the vector bits within the vector table 704 pertaining to way A. In one embodiment, this would be to bits 0, 1 and 2. Thus, when the vector r/w control 730 writes to bits 0, 1 and 2, the vector mask 732 prevents bits 3, 4 and 5 from being changed.

In addition, when the cache control 702 needs to determine which of the cache ways 708 contains a cache line that is the LRU, the vector r/w control 730 reads the vector table 704 to determine which of the cache ways has all of the vectors pointing towards it. One skilled in the art will appreciate that the size of the vector table 704 corresponds to the number of ways wherein data may be stored, and the number of lines or entries available in each way.

Figure 8:
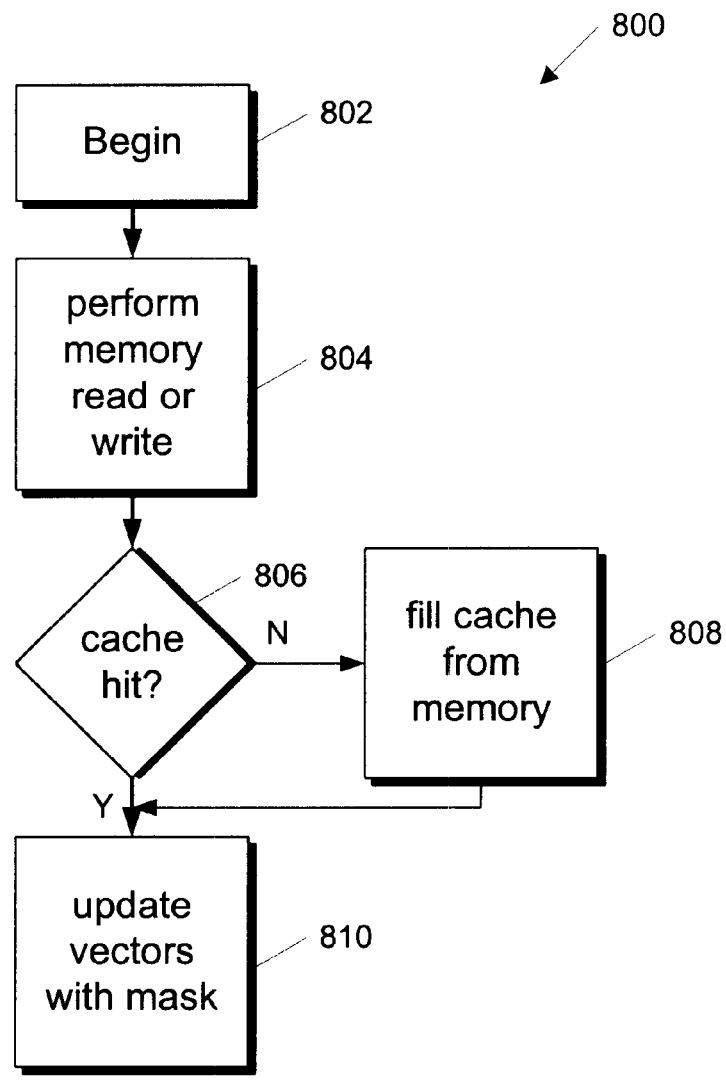
FIG. 8 is a flow chart illustrating the vector table update procedure required during cache access according to the present invention.

Referring now to FIG. 8, a flow chart 800 is provided illustrating how the LRU vector table of the present invention is utilized during a cache access. Flow begins at block 802 and proceeds to block 804.

At block 804, a memory read or write is initiated by a microprocessor. Flow then proceeds to decision block 806.

At decision block 806, a determination is made as to whether there is a cache hit. That is, does the data that is being read/written reside within one of the cache ways? If not, flow proceeds to block 808. If so, flow proceeds to block 810.

At block 808, a burst read is performed to fill the cache line that "missed" in the cache. The result of the burst read is placed into a line buffer or response buffer. Flow then proceeds to block 810.

At block 810, if the read/write results in a cache hit, then the vectors associated with the cache line in the "hit" way are updated by writing to the vectors to point away from that way. At this point, no read of the vectors has been required, nor has there been a need to modify bits in the vector table that are not associated with the "hit" way. If the read/write results in a cache miss, and a burst read has filled a response buffer, then the vector r/w control 730 must determine which of the cache ways is the LRU. It reads the entry in the vector table 704 corresponding to the cache line, and then updates the bits in the vector table to change the LRU state of the entry to MRU. The cache line is also written to the way that was the LRU.

Although the present invention has been described in considerable detail with reference to certain preferred versions thereof, other versions are possible. For example, the vector table shown in FIG. 7 pertained to a four-way cache. As mentioned above, the present invention is applicable to an N-way aliased memory system, whether a cache, or some other type of data store such as a TLB array. In addition, since it is so easy to change a way to LRU, without reading and modifying bits associated with other ways, the methodology of the present invention can be used to invalidate particular entries in particular ways, simply to updating their vectors to be LRU. This can simplify a way selection algorithm because there is no need to identify invalid ways before using the vector LRU decode/read mechanism of the present invention. Furthermore, use of the vector tracking for LRU can support lock bits. That is, one of the aliased ways may be locked so that it cannot be used as the LRU way to be replaced. The vector tracking of the present invention simply uses the LRU+1 way, without any need to change the updating algorithm. The replacements are just evenly distributed on the remaining n−1 ways.

In addition to implementations of the invention using hardware, the invention can be embodied in a computer usable (e.g., readable) medium configured to store a computer readable program code. The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished by the invention as described above can be represented in a core that is embodied in programming code and may be transformed to hardware as part of the production of integrated circuits. Also, the invention may be embodied as a combination of hardware and software. It should also be understood that various changes, substitutions and alterations can be made herein without departing from the spirit and scope of the invention as defined by the appended claims.

I claim:

1. A method for tracking an LRU state for each of a plurality of nodes the method comprising:
    associating vectors between each of the plurality of nodes, each of the vectors having a direction; and
    when one of the plurality of nodes is accessed, updating the direction of its associated vectors to reflect the access;
    wherein the LRU state for each of the plurality of nodes is determined by the direction of its associated vectors.

2. The method for tracking an LRU state, as recited in claim 1, wherein the LRU state comprises:
    least recently used (LRU);
    LRU+1;
    most recently used (MRU); or
    MRU−1.

3. The method for tracking an LRU state, as recited in claim 1 wherein the plurality of nodes comprise a set associative cache.

4. The method for tracking an LRU state, as recited in claim 3 wherein the set associative cache is a four-way cache.

5. The method for tracking an LRU state, as recited in claim 1 wherein said step of associating vectors comprises:
    establishing vectors from each of the plurality of nodes to each of the other of the plurality of nodes; and
    providing a bit in a vector table for each of the vectors, the value of the bit determining the direction of the vector.

6. The method for tracking an LRU state, as recited in claim 1 wherein each of the vectors is associated with a principle node, and a secondary node.

7. The method for tracking an LRU state, as recited in claim 6 wherein the direction of a vector is either towards or away from its principle node.

8. The method for tracking an LRU state, as recited in claim 7 wherein if the directions of all of the vectors associated with one of the plurality nodes are away from it, that one of the plurality of nodes has an LRU state of most recently used (MRU).

9. The method for tracking an LRU state, as recited in claim 7 wherein if the directions of all of the vectors associated with one of the plurality of nodes are towards it, that one of the plurality of nodes has an LRU state of least recently used (LRU).

10. The method for tracking an LRU state, as recited in claim 6 wherein the direction for each of the vectors is tracked using bits in a vector table, each bit associated with one of the vectors.

11. The method for tracking an LRU state, as recited in claim 10 wherein each bit has a value of "0" or "1".

12. The method for tracking an LRU state, as recited in claim 11 wherein a value of "0" indicates that the direction of a vector is away from its principle node.

13. The method for tracking an LRU state, as recited in claim 11 wherein a value of "1" indicates that the direction of a vector is towards its principle node.

14. The method for tracking an LRU state, as recited in claim 1 wherein access to one of the plurality of nodes comprises a read or a write.

15. The method for tracking an LRU state, as recited in claim 1 wherein said step of updating comprises:
    changing the direction of the vectors associated with the one of the plurality of nodes to point away from it.

16. The method for tracking an LRU state, as recited in claim 1 wherein said step of updating is performed without regard to the LRU states of the plurality of nodes that are not accessed.

17. The method for tracking an LRU state, as recited in claim 1 wherein the one of the plurality of nodes that has an LRU state of least recently used is found by determining which of the plurality of nodes have all of its associated vectors pointing towards it.

18. The method for tracking an LRU state, as recited in claim 1 wherein one of the plurality of nodes is invalidated by updating the node to be LRU.

19. An LRU tracking mechanism for aliased entries in a plurality of cache ways, the mechanism comprising:
    a vector table having a plurality of vector entries, each of said vector entries having a plurality of vector fields, each of said vector fields associated with one of said aliased entries in one of the plurality of cache ways; and
    vector r/w control, coupled to said vector table, for updating ones of said vector fields associated with an entry in said particular one of the plurality of cache ways when said entry in said particular one of the plurality of cache ways is accessed.

20. The LRU tracking mechanism as recited in claim 19 wherein said plurality of vector entries in said vector table correspond to the number of entries in each of said plurality of cache ways.

21. The LRU tracking mechanism as recited in claim 19 wherein each of said plurality of vector fields comprise:
    a bit, for storing a value of "0" or "1", said value indicating a vector direction for said particular one of the plurality of cache ways.

22. The LRU tracking mechanism as recited in claim 21 wherein said vector direction corresponds to whether said associated one of said aliased entries has an LRU state of least recently used (LRU).

23. The LRU tracking mechanism as recited in claim 19 further comprising:
    a vector mask, coupled to said vector r/w control and to said vector table, for masking updates to said vector table by said vector r/w control.

24. The LRU tracking mechanism as recited in claim 23 wherein said vector mask prevents said vector r/w control from writing to vector fields that are not associated with one of said aliased entries that is being accessed.

25. A method for tracking the LRU state of entries in a plurality of aliased nodes, the method establishing vectors between the entries in the plurality of aliased nodes, the vectors having a direction towards or away from an entry, the method comprising:

determining whether an access is being made to a particular entry in a particular one of the plurality of aliased nodes; and if an access is being made, updating the direction of the vectors associated with the particular entry to reflect an LRU state after the access.

26. The method for tracking the LRU state, as recited in claim 25 wherein said plurality of aliased nodes comprise a plurality of cache ways in a set associative cache.

27. The method for tracking the LRU state, as recited in claim 26 wherein the entries comprise cache lines.

28. The method for tracking the LRU state, as recited in claim 25 wherein the vectors comprise bit fields stored within a vector table.

29. The method for tracking the LRU state, as recited in claim 28 wherein the bit fields have a value of "0" or "1" to indicate a direction towards or away from an entry.

30. The method for tracking the LRU state, as recited in claim 29 wherein if all vectors associated with an entry have directions towards the entry, the entry has an LRU state of least recently used.

31. A computer program product for use with a computing device, the computer program product comprising:

a computer usable medium having computer readable program code embodied in said medium for causing an LRU vector tracking apparatus to be described, said computer readable program code comprising:

first program code for providing a vector table, said vector table having vector fields associated with LRU states for corresponding data storage entries; and second program code for providing vector r/w control to update said vector fields when said corresponding data storage entries are accessed.

32. The computer program product as recited in claim 31 wherein said vector fields comprise vectors having directions towards or away from their corresponding data storage entries.

33. The computer program product as recited in claim 31 further comprising:

third program code for providing a vector mask, coupled to said vector r/w control to mask updates to said vector fields, wherein said mask prevents updates to vector fields corresponding to data storage entries that are not being accessed.

* * * * *